(12) United States Patent
Bruso et al.

(10) Patent No.: US 9,483,289 B2
(45) Date of Patent: Nov. 1, 2016

(54) OPERATING SYSTEM IN A COMMODITY-BASED COMPUTING SYSTEM

(71) Applicants: Kelsey L Bruso, Roseville, MN (US); Michael A Salsburg, Phoenixville, PA (US); Philip J Erickson, Roseville, MN (US)

(72) Inventors: Kelsey L Bruso, Roseville, MN (US); Michael A Salsburg, Phoenixville, PA (US); Philip J Erickson, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 47 days.

(21) Appl. No.: 14/108,512

(22) Filed: Dec. 17, 2013

(65) Prior Publication Data

US 2014/0310705 A1    Oct. 16, 2014

Related U.S. Application Data

(60) Provisional application No. 61/738,161, filed on Dec. 17, 2012.

(51) Int. Cl.
　　*G06F 9/455*　　(2006.01)
　　*G06F 17/30*　　(2006.01)
　　*G06F 9/50*　　(2006.01)
　　*G06F 3/06*　　(2006.01)

(52) U.S. Cl.
　　CPC ....... *G06F 9/45533* (2013.01); *G06F 9/45558* (2013.01); *G06F 9/5011* (2013.01); *G06F 9/5061* (2013.01); *G06F 17/30336* (2013.01); *G06F 3/06* (2013.01); *G06F 9/5077* (2013.01)

(58) Field of Classification Search
　　CPC ........................................ G06F 9/455–9/45558
　　See application file for complete search history.

(56) References Cited

U.S. PATENT DOCUMENTS

| 8,619,971 | B2* | 12/2013 | Kurien et al. | 380/257 |
| 2006/0236127 | A1* | 10/2006 | Kurien | G06F 9/5077 713/193 |
| 2006/0259731 | A1* | 11/2006 | Oshins | G06F 9/45537 711/173 |
| 2007/0198976 | A1* | 8/2007 | Leis | G06F 9/45537 718/1 |
| 2009/0037906 | A1* | 2/2009 | Armstrong | G06F 9/45558 718/1 |
| 2012/0084480 | A1* | 4/2012 | Reeves | G06F 9/44505 710/303 |
| 2012/0167081 | A1* | 6/2012 | Sedayao | G06F 11/30 718/1 |
| 2012/0179771 | A1* | 7/2012 | Ganti | G06F 9/45558 709/213 |
| 2014/0115579 | A1* | 4/2014 | Kong | G06F 3/0605 718/1 |

OTHER PUBLICATIONS

Robertson, George, et al., "Scalable Fabric: Flexible Task Management", 2004, pp. 85-89.*

(Continued)

*Primary Examiner* — Thuy Dao
*Assistant Examiner* — Christopher Franco
(74) *Attorney, Agent, or Firm* — Robert P. Marley; Richard J. Gregson

(57) ABSTRACT

Disclosed herein is a commodity infrastructure operating system that manages and implements the resources and services found in the heterogeneous components of the common infrastructure. The infrastructure operating system managing one or more services residing within an operating system image of a partition. The infrastructure operating system capable of providing a service of a first partition's operating system to a second partition's operating system when the second partition is in need of the service.

20 Claims, 10 Drawing Sheets

(56) References Cited

OTHER PUBLICATIONS

Mignolet, J-Y, et al., "Infrastructure for design and management of relocatable tasks in a heterogeneous reconfigurable system-on-chip", 2001, pp. 1-6.*

Kallahalla, Mahesh, et al. "SoftUDC: A Software-Based Data Center for Utility Computing", 2004, pp. 38-46.*

Sotomayor, Borja et al., "Virtual Infrastructure Management in Private and Hybrid Clouds", 2009, pp. 14-22.*

Poellabauer, Christian et al., "Cooperative Run-time Management of Adaptive Applications and Distributed Resources", 2002, pp. 402-411.*

Mariani, Giovanni, et al., "Using Multi-objective Design Space Exploration to Enable Run-time Resource Management for Reconfigurable Architectures", 2012, pp. 1-6.*

* cited by examiner

OPERATING SYSTEM IN A COMMODITY-BASED COMPUTING SYSTEM

CROSS-REFERENCE TO RELATED APPLICATIONS

This application claims priority to U.S. Provisional Patent Application Ser. No. 61/738,161 filed Dec. 17, 2012, which is incorporated by reference in its entirety.

FIELD OF THE DISCLOSURE

The subject matter disclosed herein relates generally to resource management in a commodity computing environment.

BACKGROUND

Computing systems sharing various infrastructure and software components have many desirable attributes; however, one of the challenges of using them is to support applications, often mission-critical applications, while taking advantage of low cost "commodity" infrastructure. Such environments can be thought of as "commodity-based" infrastructures in which heterogeneous computing components are amalgamated into a common computing system.

Such computing environments may result in a heterogeneous collective of commodity components, each needing access to applications, data, hardware resources, and/or other computing resources, across the computing system. Often, operating such environments requires developers to possess and/or utilize a variety of commodity skills and tools.

What is needed is a computing system in which applications are easy to create and/or execute, without losing the advantages of either the common infrastructure paradigm or the individual commodity components inhabiting the common infrastructure. What is needed is way to keep features of common infrastructure computing while enabling commodity skills and tools to effectively operate applications of many types, with focus in some cases on mission critical applications. What is needed is an automated manner in which an application that spans heterogeneous computing components can be commissioned as a single object, as opposed to manually commissioning the individual services and computing components.

Traditional integrated operating systems include all service components for a computing system into an application execution environment, file and storage management service, database management service, messaging service, and so on. Such, integrated operating systems execute on either a dedicated physical platform or on a virtualized platform managed by a hypervisor.

Depending on the operating system deployed onto a platform, the services, and the manner in which they execute, may vary. Management of an integrated operating system is often accomplished by management tools also integrated into the operating system itself. In well-known networking environments, there may be a variety of integrated operating systems deployed, thereby resulting in a "heterogeneous" environment.

What is needed is a way to pool, manage, control, and/or allocate, the varying services of the disparate operating systems in a heterogeneous environment.

Storing data on a computing device, in a reusable format, is well-known in the art. Once stored, adding and updating data is now commonly used in transaction processing by online transaction processing ("OLTP") technologies. As transaction processing demands rise, emphasis is shifting from data storage and retrieval to implementing tools for business analytics.

What is needed is a common infrastructure capable of storing, distributing, and retrieving data, while also efficiently operating within a common infrastructure's heterogeneous and potentially geographically-dispersed environments, to perform data analytics. What is also needed is a way for data to be stored according to various database models.

In known enterprise systems or transactional applications, utilizing a variety different database models, e.g., network or hierarchical, the higher-level applications must organize the underlying data so that the data complies with the various database models.

What is needed is a way for applications and/or databases to store and/or utilize data, regardless of database models, without altering the applications, databases, and/or data.

Transactional applications may be built on a variety of models, e.g., functioning on programming that is stored a database with a network model, but storing and retrieving data in database with a relational model. Data is often copied, or replicated, between these databases to ensure the data is in the right model.

What is needed is way to mitigate or eliminate the need to extract, transform, and/or load data between databases. What is needed is a way for devices to view and/or interact with "live" data without the need for copies.

SUMMARY

Disclosed herein is a commodity infrastructure operating system that manages and implements the resources and services found in the heterogeneous components of the common infrastructure.

In one embodiment, a computer-implemented method for managing computing resources comprising: monitoring, by a computer, one or more execution environments associated with one or more partitions, wherein an execution environment comprises one or more services executed by an operating system that resides on an associated partition; detecting, by the computer, a service need associated with a first execution environment when the operating system of the first execution environment does not comprise the service needed; providing, by the computer, a service of a second execution environment to the first execution environment based on the service need associated with the first execution environment; executing, by the computer, each of the one or more services independently of each of the execution environments; and executing, by the computer, each of the one or more services independently of each of the one or more services.

In another embodiment, a distributed-computing system comprising: one or more processors executing a fabric operating system managing one or more execution environments and comprising one or more fabric operating system services executed by one or more partitions that reside on one or more platforms, wherein an execution environment comprises an operating system executing one or more partition services, and wherein the fabric operating system services comprise a set of the partition services of one or more operating systems; one or more platforms comprising one or more partitions associated with the one or more execution environments; and an interconnect linking a plurality of execution environments, wherein the fabric operating system is configured to provide a partition service of the operating system of a first execution environment to a second execution environment to satisfy a partition service need.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
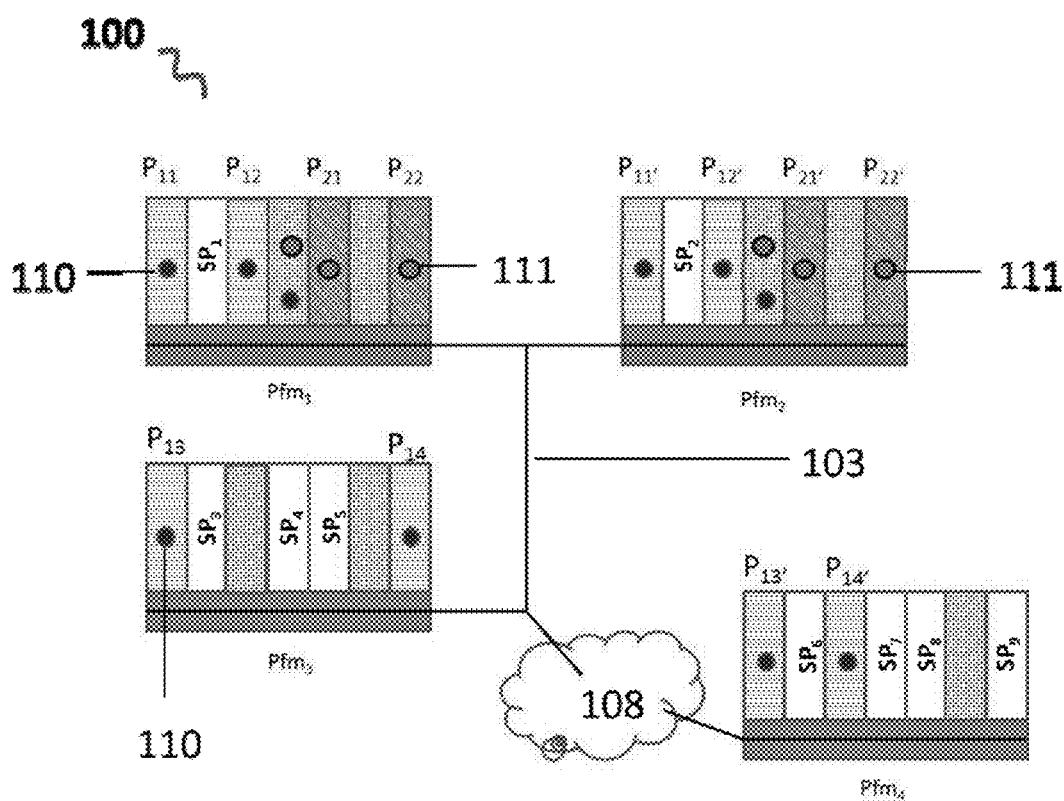
FIG. 1 illustrates a schematic representation of a common infrastructure.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Fabric Computing Architecture

In some embodiments, the components may be formed into logical groups that allow the common infrastructure to implement the sum of the components in a concerted manner. For example, a hardware group may support high-availability or disaster-recovery configurations for infrastructure resources through redundancy and/or load-balancing. As another example, software groups comprising one or more "images" may be specified to seamlessly operate in concert as a single application though several images are operating at once.

Embodiments of a common infrastructure comprise all platforms, service partitions, and an interconnect or interconnect fabric that facilitates communication between one or more partition images residing on each of the platforms. The common infrastructure comprises a suite of hardware, software, and services (together "components"), which may generate and/or support partitioned computing environments. These partitions may be linked together through the fabric-based infrastructure using the interconnect.

A partition can be a set of one or more computing resources of a physical platform that are capable of supporting, isolating, and containing, on the platform an operating system image, middleware, and/or one or more applications. The partition residing on a platform is generated, and in some embodiments, managed, by a hypervisor component. In other words, a partition may be a set of physical platform resources allocated by the platform's hypervisor instance to isolate and contain a discrete execution environment within the partition being created. In some embodiments, the hypervisor allocates resources to a partition such that the hypervisor prohibits those allocated resources from being shared with other partitions that may also reside on the platform. In other embodiments, the hypervisor may be capable of dual-assigning a subset of the platform's resources to more than one partition residing on the platform. Further embodiments capable of dual-assignments of platform resources across more than partition may be capable of automatically detecting a dual-assignment need.

An operating system image may be the operating system, middleware, business logic, and/or applications, which execute within a partition and capable of being persisted in some non-transitory machine-readable storage.

Embodiments of a common infrastructure may comprise one or more platforms. Each platform is a computing device comprising a hypervisor. A platform is often a server computer. But, depending upon the embodiment, a platform may be a physical server, a personal computer, or other physical computing hardware capable of meeting the computing requirements of a platform in accordance with the invention. A physical server may be a computing device, or other hardware, capable of hosting multiple operating system images.

A hypervisor may be a hardware component, and/or a software component, of the fabric that resides on a platform. A hypervisor may be capable of partitioning the computing resources of the platform into one or more partitions.

In some embodiments, the hypervisor is also capable of managing the computing resources residing on a platform. Depending upon the embodiment, each platform in the infrastructure hosts zero or one hypervisor partitioned instances. An instance can be a collection of interdependent guest partitions and/or service partitions. A service partition can be a partition image intended for infrastructure administration. In some embodiments, service partitions are administered by the infrastructure administration and behave as virtual machines. A guest partition being a partition image where applications, and in some cases the environment of the partition as a whole, may be managed by the customer.

Embodiments of such a fabric architecture may implement various applications in virtualized computing environments. Some embodiments may consolidate one or more applications, or application parts, onto a single platform. Other embodiments may consolidate one or more applications, or application parts, into a single common infrastructure. In embodiments implementing partitioning capabilities, the partitioning capabilities may isolate one or more virtual environments from one another without regard to the physical servers housing the virtual environments.

The common infrastructure, sometimes referred to as fabric computing may be a collection of one or more component nodes and, in some cases, non-component nodes. Component nodes are those nodes storing and/or executing infrastructure management tools. Each of the software tools and each of the physical structures are each components of the infrastructure.

FIG. 1 illustrates a schematic representation of a common infrastructure.

A common infrastructure 100 may comprise one or more platforms $P_{fm1}$, $P_{fm2}$, $P_{fm3}$, $P_{fm4}$ that are partitioned by hypervisor instances into one or more partitions: a service partition $SP_x$, a set of partitions $P_{1j}$ that each host an operating system image executing a first enterprise application ("App1") 106, and a set of partitions $P_{2j}$ that each host an operating system image executing a second enterprise application ("App2") 107.

An interconnect fabric 103 may be associated with one or more platforms $P_{fm2}$. An interconnect fabric 103 may contain one or more infrastructure connections, or endpoints 110, 111. An endpoint 110, 111 may be a service, application, and/or other computing resource within a partition that that uses a connection to facilitate communication between partitions $P_{1j}$, $P_{2j}$. For example, a first partition $P_{11}$ utilizes an endpoint 110 service to communicate with an endpoint 110 service of a second partition $P_{13}$. In the present embodiment, partitions $P_{1j}$, $P_{2j}$ may be members of an application 106, 107 that communicate through the interconnect 103 using their respective endpoint services 110, 111.

For example, a first partition $P_{11}$ on a first platform $P_{fm1}$ has an operating system image that executes App1 106; this partition $P_{11}$ is a member of App1 106. Endpoint 110 services available to App1 106 may effectively isolate communications from App2 107, allowing the first partition $P_{11}$ to target the endpoint 110 services of App1 106 residing on a second partition $P_{13}$ found on a second platform $P_{fm3}$.

In some cases, the interconnect 103 utilizes a networking connection technology for communication requirements beyond the physical server. In such cases, endpoints 110, 111 may require communication over a network 108, which may use Ethernet and/or other networking technologies.

As an example, App1 106 contains partitions that communicate as adjacent partitions $P_{11}$, $P_{12}$. The data transfer for these communications will be memory, as opposed to wire. Communications between co-located partitions $P_{11}$, $P_{13}$ may implement a low-latency, high capacity medium such as InfiniBand. Partitions $P_{13}$ and $P_{13'}$ communicating over a wider area, between facilities for example, will communicate through a network 108, such as a local area network (LAN) or, in some embodiments, a wide area network (WAN).

In some embodiments, specific partitions $P_{1x'}$ are configured to provide high availability. That is, a partition $P_{13'}$ may be a redundant copy of its counterpart $P_{13}$ for redundancy.

Figure 1A:
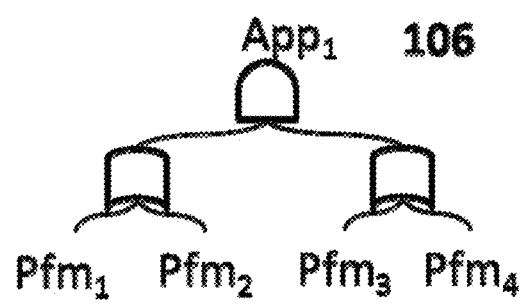
FIG. 1A illustrates fault trees relating to each application in an exemplary embodiment.
Figure 1A:
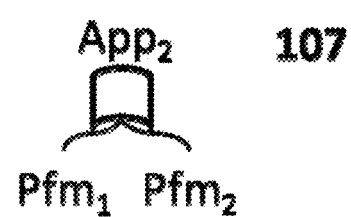

FIG. 1A illustrates fault trees relating to each application in the exemplary embodiment of FIG. 1.

In FIG. 1A, each application 106, 107 is mapped to the physical topology required to operate each of the applications. For example, App2 107 is functionally dependent upon on either $P_{fm1}$ or $P_{fm4}$ being functional. In some embodiments, application availability is managed through a fault tree similar to that of FIG. 1A for high-availability. The common infrastructure of FIG. 1 extends availability of components, such as applications 106, 107 across multiple geographic areas. FIG. 1 and FIG. 1A brings components into a single infrastructure, or fabric, for redundancy, high-availability, and ubiquity.

A Fabric Operating System

Figure 2:
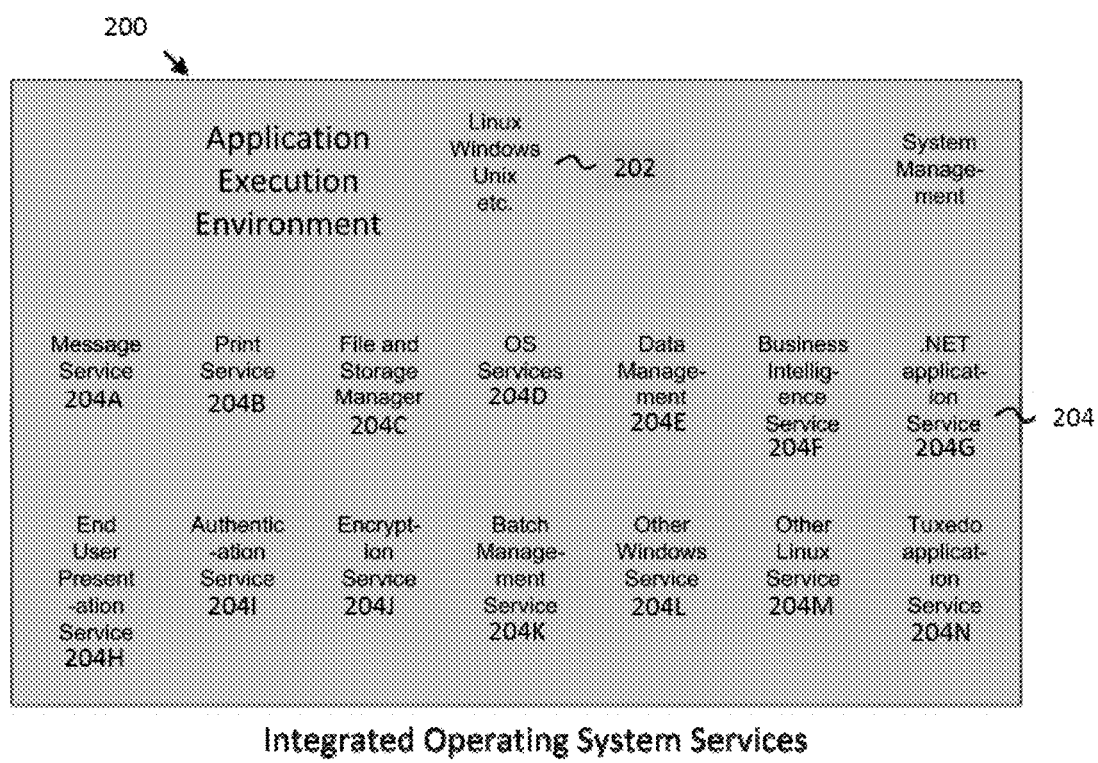
FIG. 2 illustrates a prior art application execution environment with examples of services available in an integrated operating system stack.

FIG. 2 illustrates a prior art application execution environment with examples of services available in an integrated operating system stack.

In FIG. 2, an application execution environment 200 contains several types of services that may be available in an integrated operating system stack. Examples of operating systems 202 that are an integrated operating system include Linux®, Windows®, and Unix®.

An integrated operating system 202 provides a set of application programming interfaces to low-level services needed to execute an application itself; examples of these low-level services may include memory management, CPU management, task or thread management, and so on. An application programming interface (API) is code, software, firmware, or other module of a computer, which specifies how various programs, software, firmware, and other aspects of computing devices, should interact.

The integrated operating system 202 also provides APIs to a set of high-level services 204, such as a data management service 204E, using, for example, a SQL API. Further examples may include a message service 204A using, for example, the IBM® WebSphere® Message Queue API; an authentication service 204I using, for example, the Kerberos API; and a file and storage management service 204C using, for example, the POSIX® API.

Depending on the operating system deployed onto a platform, the services, and the manner in which they execute, may vary. Management of the integrated operating system is often accomplished by management tools also integrated into the operating system itself. Depending upon the embodiment, various integrated operating systems may be used, thereby resulting in a heterogeneous environment.

Figure 3:
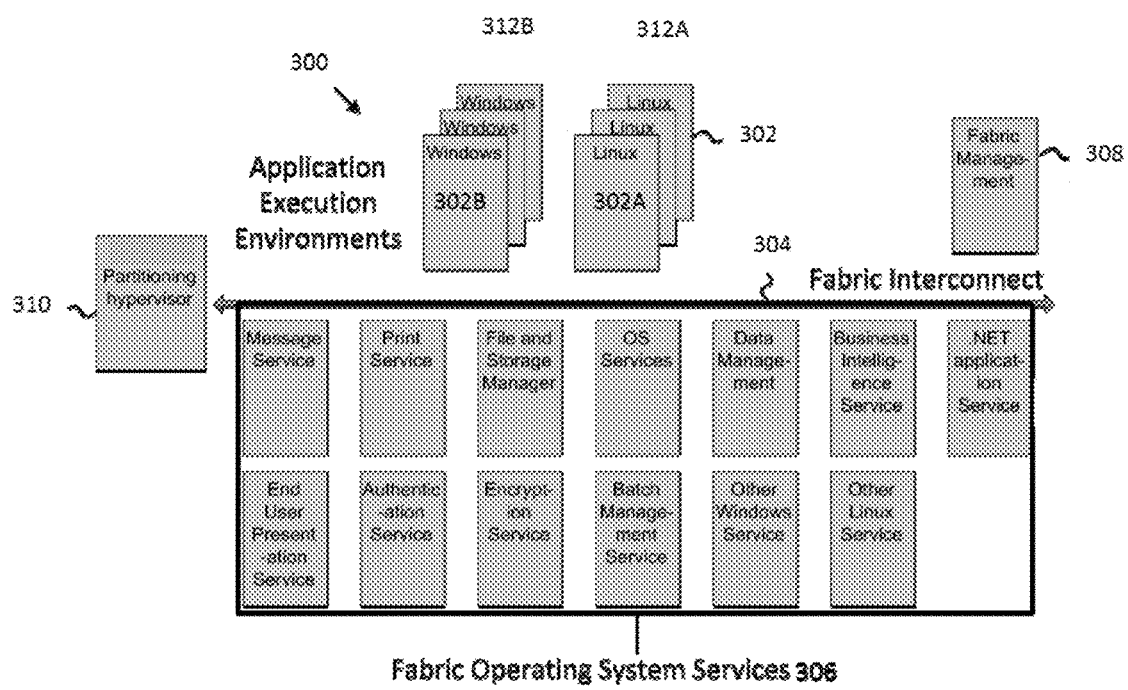
FIG. 3 illustrates a fabric operating system approach to providing services to an application in an exemplary embodiment of the common infrastructure.

FIG. 3 illustrates a fabric operating system approach to providing services to an application in an exemplary embodiment of the common infrastructure.

In FIG. 3, a partitioning hypervisor 310 that enables the fabric interconnect 304 and one or more secure, isolated virtual platforms, or partitions 302 on which the application execution environments 302A, 302B and also on which the fabric operating system services 306 execute. A partition 302 provides a commissioned operating system 312A, 312B with a set of hardware resources allocated from the physical platform.

In certain embodiments, when creating, or commissioning, a new partition 302, an administrator may choose the software tools to manage the virtual platform's hardware. Non-limiting example may be a simple hardware adaptation layer, a microkernel operating system, or a full integrated operating system environment.

The services 306 related to a first application execution environment 302A may execute independently from services 306 related to a second application execution environment 302B. Moreover, each of these application execution environments 302A, 302B may execute independently from each of the fabric operating system's services 306.

Depending upon the embodiment, a partition's 302 operating system 312A, 312B may range from a simple hardware adaptation layer to a sophisticated integrated operating system, such as the example integrated operating system 202 illustrated in FIG. 2. The particular operating system for a partition in an exemplary embodiment may be based on the needs of one or more services 204A-N that are hosted by the particular partition 302.

Embodiments of the fabric operating system provide common fabric operating system services 306 that may be used by all application execution environments 302A, 302B. Thus, depending upon the embodiment, one or more particular partitions' 302 operating systems 312A may be scaled back to implement only a subset of the services that are required to execute an application, thereby relying on the fabric operating system's services 306 to supply higher-level services unrelated to the application's execution.

The interconnect 304 provides interconnectivity among the application execution environments 302A, 302B and the fabric operating system services 306 provided for their use from within the fabric 300. In some embodiments, the fabric interconnect 304 may be a high-speed, low-latency interconnection protocol and/or hardware, which may employ technologies such as InfiniBand or other high-speed, low-latency connectivity technology.

The fabric operating system services 306, which execute independently of the application execution environments 302A, 302B and execute independently of each other to provide services in support of the applications hosted in the partitions 302 of the fabric 300.

Depending upon the embodiment, and based on the needs of the service being hosted in the partition 302, the partition's 302 operating system 312A execution environment 302A may range from a simple hardware adaptation layer to an integrated operating system.

The fabric manager 308 executes as a part of the fabric environment 300, but independently of the application execution environments 302A, 302B and independently of the fabric operating system services 306.

The interconnect 304 may provide interconnectivity between components, perform various security functions, and perform one or more management duties for the fabric 300. The interconnect is managed by the fabric manager 308.

The fabric operating system is different from any of the integrated operating systems 312A, 312B because the application execution environment 302A, 302B and the operating system services 312A, 312B execute independently on their own virtual platforms, i.e., partitions 302.

The fabric operating system is distinct from each distributed operating system 312 of the fabric 300. Each virtual platform 302 in the fabric 300 hosts its own homogeneous operating system 312A, 312B. The distributed fabric operating system is a heterogeneous environment that is the sum of constituent parts, i.e., the operating systems 312A, 312B.

The fabric operating system's constituent operating systems 312 may each be hosted on independent physical and/or virtual platforms 302. However, the fabric operating system projects a homogenous integrated operating system view to each of the applications that are hosted within the fabric 300 environment, thereby obscuring and/or hiding the distributed nature of the underlying services supplied from the applications and/or services 306 in the fabric 300.

An embodiment of a fabric operating system comprises the constituent heterogeneous operating systems residing on partitions, which in some cases include one or more integrated operating systems. By contrast, in network operating systems, all participating devices in the network environment, or nodes, are assumed to be homogeneous. Embodiments of a fabric operating system are not constrained by homogeneity. The nodes in a network operating system focus on a means for allowing the nodes to communicate. In some embodiments, the fabric operating system may implement an interconnect as just one in a plurality of possible services.

A network operating system focuses on providing a service such as a file server service, for example, a client-server software application. Embodiments of a fabric operating system may include the software application execution environments in addition to the service provider environments. That is, a fabric operating system may not follow a client-server model. In certain embodiments, the fabric operating system may separate between the application execution environments and the service environments, but may not include the management of the common infrastructure environment provided by the fabric manager, nor the security or isolation provided by the interconnect and the hypervisor.

In some embodiments, the fabric operating system uses the native APIs provided by the services of the constituent operating system and component applications. A fabric operating system does not enforce a single set of APIs between the service providers and the service consumers and is therefore more robust than an enterprise service bus.

The heterogeneous operating system model of the fabric operating system uses the interconnect to utilize the services residing in each of the separate heterogeneous execution environments, such as partitions and/or virtual machine. Thus, services may traverse partitions, from a first operating system image to another, as though local to the first operating system image. That is, in some embodiments, the set of all services across the partitions may present the same behaviors of a constituent operating system.

Operating System Images, Blueprints, and Commissioning

In some embodiments, a customer may select from one or more possible operating systems to implement on the partitions. Depending upon the embodiment, operating system images may provide choice of preconfigured operating system blueprints that may be quickly deployed, easily cloned, and maintained.

In embodiments utilizing blueprints, the hypervisor may create partitions to populate them quickly with blueprinted images. That is, partitions may be generated using a blueprint. High levels of automation for commissioning operating systems and managing runtime operation enhances resilience and availability and also reduces operational costs.

Referring to FIG. 1A, some embodiments may implement automation techniques that may determine one or more platforms on which these partition images may be commissioned, thereby providing redundancy and fault tolerance. Further embodiments may utilize these automation techniques to determine the most efficient and/or effective partitions, which should receive a commissioned partition blueprint, operating system image, and/or application.

For example, in an exemplary embodiment illustrated in FIG. 1A, App1 106 is initially executed within four execution environments; the execution environments of member partitions $P_{11}$, $P_{12}$ residing on a first platform $P_{fm1}$, and the execution environments of member partitions $P_{13}$, $P_{14}$ residing on a third platform $P_{fm3}$. In this exemplary embodiment, the common infrastructure may automatically determine that a second platform $P_{fm2}$ and a fourth platform $P_{fm4}$ are effective platforms on which to commission redundant member partitions $P_{11'}$, $P_{12'}$, $P_{13'}$, $P_{14'}$ of App1 106.

Figure 4:
FIG. 4 illustrates the various blueprints that may be commissioned into partitions of the common infrastructure.

FIG. 4 illustrates the various blueprints that may be commissioned into partitions of the common infrastructure.

A gold image 401 may be a blueprint that is provided by the fabric administrator to the customer to implement on one or more partitions. The gold image is a type of blueprint having a standardized operating system. In some embodiments, for example, the gold image 401 may be a preconfigured Microsoft Windows® or Linux distribution.

A data storage and/or data analytics blueprint, or data blueprint 402, may be a preconfigured operating system having a file management and analytics module. For example, a data blueprint 402 may be a Linux gold image preconfigured with an instance of a Hadoop distributed file system.

Optionally, a customer may provide operating system images to the infrastructure administrator as a customer-supplied blueprint 403. These may be blue prints having blank gold images 301, which are then configured to support the customer's selections, thereby resulting in the customer-supplied blueprint 303.

Figure 5:
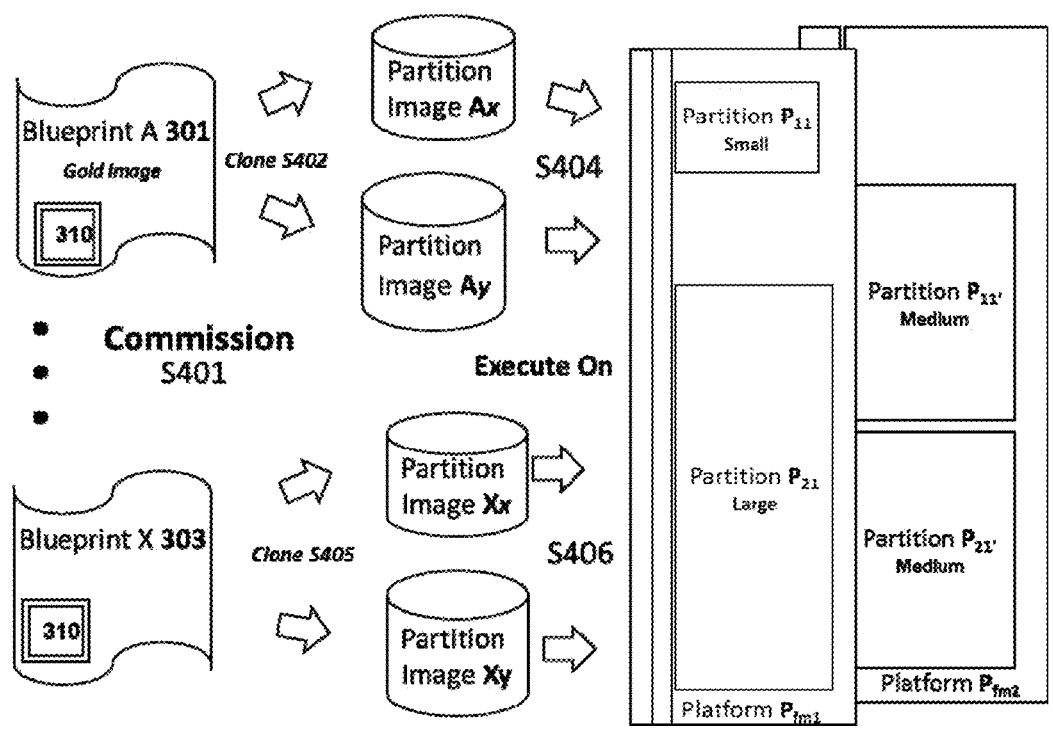
FIG. 5 illustrates the features and process of commissioning operating systems, thereby commissioning into the infrastructure one or more services that reside on the blueprints.

FIG. 5 illustrates the features and process of commissioning operating systems, thereby commissioning into the infrastructure one or more services that reside on the blueprints.

In S401, one or more blueprints 301, 303 are commissioned into the common infrastructure. In FIG. 4, a first blueprint may be a gold image 301 executing a customer supplied application 310, and a customer-supplied blueprint 303 hosting a customer supplied operating system image 312.

In S402, the commissioning process may generate one or more copies, or clones, of the gold image 301. During this cloning, in S402, the one or more gold images are propagated onto corresponding partition images Ax, Ay.

In S404, the hypervisor partitions one or more platforms $P_{fm1}$ into one or more partitions $P_{11}$ that will execute the partition images Ax, Ay. In some embodiments, a platform $P_{fm2}$ may host one or more redundant partitions $P_{11'}$.

In S405, the commissioning process may generate clones of the customer-supplied image 303. During this cloning, in S405, the one or more customer-supplied images are propagated onto corresponding partition images Xx, Xy.

In S406, the hypervisor partitions one or more platforms $P_{fm1}$ into one or more partitions $P_{21}$, which will be receiving the partition images Xx, Xy. In some embodiments, a platform $P_{fm2}$ host one or more redundant partitions $P_{21'}$.

Some embodiments may implement automation to remove administrative error, and improve reliability and consistency of an application or other aspect of the infrastructure, thus enhancing mission-critical applications.

For example, in some embodiments, automation may enable one or more blueprints, each having subcomponents of a whole application, to be automatically commissioned onto partitions, thereby relieving an administrator of the error-prone task of commissioning the components one at a time.

As a further example, some embodiments may automatically determine the proper physical platforms for these subcomponents of an application to commission onto, thus establishing redundancy and improving application availability.

Further embodiments may automatically commission one or more images as subcomponents of a whole application.

Interconnect Fabric

Depending upon the embodiment an interconnect fabric may comprise some combination of software, hardware, hardware media, and/or firmware. The interconnect may interlink one or more platforms and the partitions within them. The interconnect may make the connection technology implemented invisible to applications and to the operating systems in the partitions, thereby facilitating higher-level interface applications and programming that expect one type of technology, but allowing for lower-lever technologies to operate independently. One non-limiting example may be a case where a higher-level socket-based programming effort utilizes Ethernet networking protocols, however connectivity may still operate using InfiniBand, without having to change the application to support InfiniBand.

Figure 6:
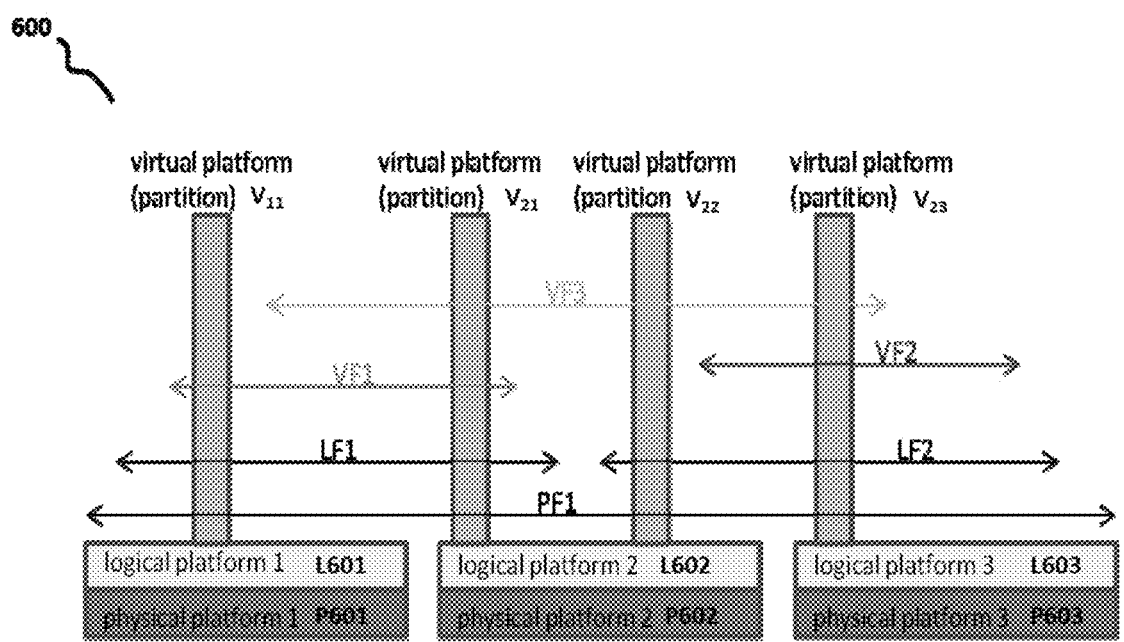
FIG. 6 illustrates an embodiment of the interconnect fabric and the various aspects.

FIG. 6 illustrates an embodiment of the interconnect fabric and the various aspects.

The interconnect fabric 600 facilitates communications between the components of the common infrastructure. Depending upon the embodiment, the interconnect fabric 600 comprises any permutation of three aspects: one or more physical fabrics PF1, one or more logical fabrics LF1, LF2, and one or more virtual fabrics VF1, VF2, VF3. Depending upon the embodiment, there may be any permutation of three platforms: a physical platform P601, P602, P603, a logical platform L601, L602, L603, and a virtual platform (also called a "partition") $V_{11}$, $V_{21}$, $V_{22}$, $V_{31}$.

An exemplary embodiment of the interconnect fabric 600 comprises three physical platforms P601, P602, P603 each of which host a logical platform L601, L602, L603. Each of the logical platforms may host one or more virtual platforms, or partitions $V_{11}$, $V_{21}$, $V_{22}$, $V_{31}$.

A physical fabric PF1 may transport data and messages between physical platforms P201, P202, P203 of the common infrastructure. Depending upon the embodiment, the physical fabric PF1 may comprise a collection of one or more physically isolated segments, one or more switches, one or more attachment ports, and the one or more platforms.

An isolated segment comprises a transport medium that varies depending upon the embodiment. Non-limiting examples of transport mediums for an isolated segment include: copper wire, optical cable, and/or a memory bus.

Embodiments may vary based on the physical interconnectivity requirements, such as geography, redundancy, and bandwidth requirements. For example, in embodiments where each partition ("virtual platform") resides on the same physical platform there is no need for attachment ports or wiring since all of the partitions are adjacent partitions. Other embodiments may require the physical fabric to span geographic distances using suitable technologies, e.g., LAN or WAN technologies.

In some embodiments data and messages may be exchanged between physical segments via an optional gateway or router device. In some embodiments, a data center hosting one or more common infrastructures may contain more than one physical fabric.

A logical fabric LF1, LF2 may provide a trusted communications path between sets of platforms or partitions. The logical fabric LF1, L2 divides the physical fabric PF1 into logical chunks. For example, a first logical fabric LF1 and a second logical fabric LF2 logically divides the physical fabric.

Each logical fabric LF1, LF2 provides a trust anchor for the set of platforms or partitions, which are needed to communicate in some embodiments. Embodiments of the common infrastructure interconnect may have a physical fabric PF1 utilizing at least one logical fabric LF1, LF2 that enables the trusted communication mechanisms for the logical platforms L201, L202, L203 residing on the interconnect fabric 600.

A virtual fabric VF1, VF2, VF3 may reside within a logical fabric LF1, LF2 as a virtualized network. For example, in some embodiments, the virtual fabric is in the form of a virtual local access network (VLAN). A logical fabric LF1, LF2 may have one or more virtual fabrics VF1, VF2, VF3 within it. For example, a first logical fabric LF1 may host two logical fabrics VF1, VF3.

A physical platform P201, P202, P203, is a physical computing device. In some embodiments it is a server that slides into a server rack; however, it should be appreciated that any computing device capable of meeting the requirements of the physical platform will suffice. In some embodiments, the physical platform P201, P202, P203 connects to one or more physical fabrics PF1 with physical cables, such as InfiniBand or Ethernet cables.

In some embodiments, the physical platform P201, P202, P203 includes an interface card and the related software, such as a Integrated Dell® Remote Access Controller (iDRAC) interface card; and the physical platform may include BIOS software.

A hypervisor may reside between a physical platform P201 and a logical platform L201 layer, thereby creating the logical platform from the physical components of the physical server.

A logical platform L202 is a set of resources that the hypervisor allocates to the partitions $V_{21}$, $V_{22}$ it creates and/or manages on a physical platform P202, e.g., memory, cores, core performance registers, NIC ports, HCA virtual functions, virtual HBAs, and so on. Depending upon the embodiment, there are two forms of logical platform L201, L202, L203 operation and characteristics. In some embodiments, a logical platform may be a partitionable enterprise partition platform ("PEPP"), and in some embodiments a logical platform may be a non-partitionable enterprise partition platform ("NEPP").

A PEPP is a logical platform L202 generated by a hypervisor that generated one or more partitions $V_{21}$, $V_{22}$ that are intended to utilize resources allocated from the physical platform P202. In some embodiments, the hypervisor might only expose a subset of a physical platform's P202 capabilities to the logical platform L202.

A NEPP is a logical platform L203 that includes all of the hardware components of the physical platform P203 and an agent module that contains credentials that allows the physical platform P203 hosting the NEPP logical platform L203, to join the logical fabric LF2 for logical platforms to communicate L202, L203.

A virtual platform $V_{21}$, $V_{22}$ is the collection allocated resources that result in an execution environment, or chassis, created by the hypervisor for a partition. A virtual platform comprises a subset of the logical platform's L202 resources that were allocated from the physical platform P202 by the hypervisor and assigned to a virtual platform $V_{21}$.

In some embodiments, each virtual platform's $V_{21}$, $V_{22}$ componentry is unique. That is, in such embodiments, the hypervisor will not dual-assign underlying components. In other embodiments, however, the hypervisor may dual-assign components and capabilities, such as situations requiring dual-mapped memory for shared buffers between partitions. In some embodiments, the hypervisor may even automatically detect such requirements.

The services in dialog over the interconnect may be hosted in different partitions or in the same partition. Depending upon the embodiment, there may be two types of infrastructure connections: memory connections, and wire connections. Memory connections may be inter-partition or intra-partition communication that may remain within a physical platform.

Wire connections may be connections occurring over an isolated segment, e.g., a copper wire, using a related protocol, e.g., Ethernet or InfiniBand. Applications may transmit and receive information through these wire connections using a common set of APIs. The actual transmission media protocols used to control transmission are autonomically selected by the embedded intelligence of the interconnect fabric. Embodiments of an interconnect may provide communication APIs that are agnostic to the underlying transports. In such embodiments of the interconnect, the one interconnect may support all transport protocols.

In the exemplary embodiment, a first partition $V_{11}$ is capable of communicating with a second partition $V_{21}$ over a first logical fabric LF1 and a first virtual fabric VF1.

The second partition $V_{21}$ may communicate with a third partition $V_{22}$ and a fourth partition $V_{31}$, over a third virtual fabric VF3. Communication between the second partition $V_{21}$ and the third partition $V_{22}$ requires each of the partitions $V_{21}$, $V_{22}$ to share the trust anchors of the first and second logical fabrics LF1, LF2 with the third virtual fabric VF3 because the third virtual fabric VF3 is needed to span the gap between the logical fabrics LF1, LF2.

The third partition $V_{22}$ may communicate with the fourth partition $V_{31}$ using the second logical fabric LF2 and the third virtual fabric VF3.

Interconnect communications may be of two types: wire connections and memory connections. Wire connections are inter-server communications requiring some use of network transmission protocols, e.g., internet protocol (IP) or InfiniBand (IB) connections. In embodiments requiring wire connections applications may transmit and receive information through wire connections using a common set of APIs.

In some embodiments, the intelligence governing interconnect fabric communications may autonomically select the actual transmission media protocols used to during transmissions.

Fabric Manager

A fabric manager may be a permutation of software and/or hardware components that may manage the plurality of functions and the various aspects of an exemplary embodiment of a common infrastructure.

Figure 7:
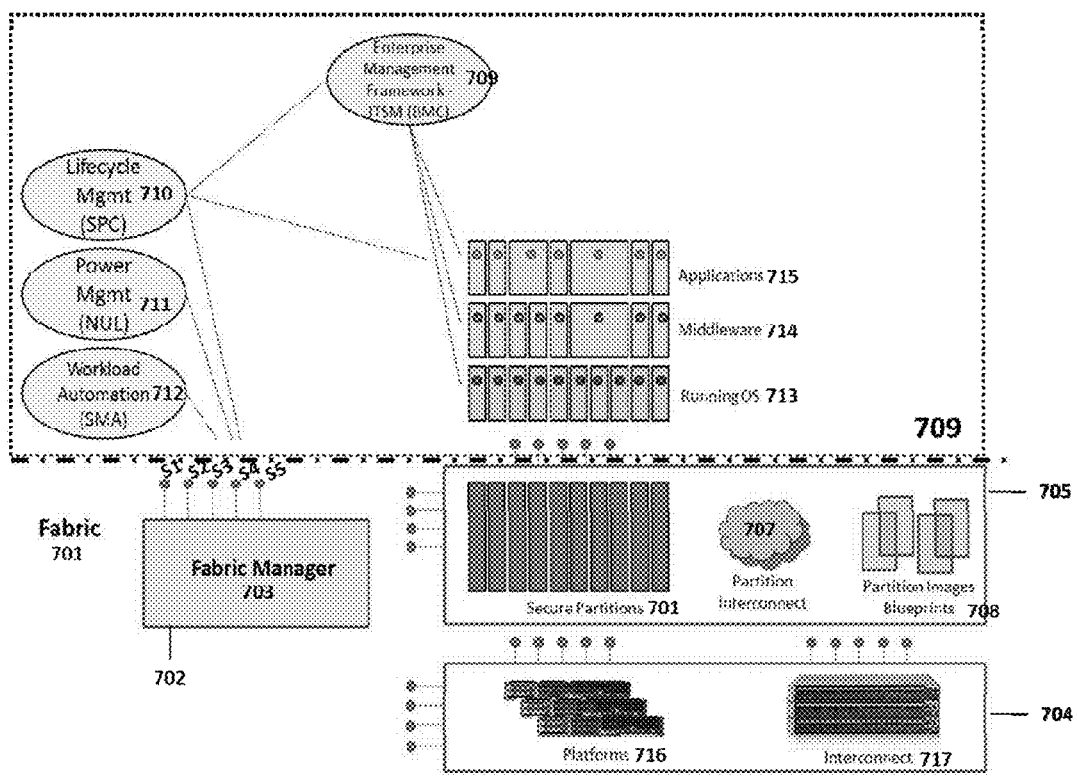
FIG. 7 illustrates a common infrastructure architecture showing various types of managers in a datacenter and their management domains.

FIG. 7 is a common infrastructure architecture showing various types of managers in a datacenter and their management domains.

In some embodiments of the common infrastructure, there is a fabric management platform 702 housing a fabric manager 703 that governs the resources and communications of the fabric 701 and the components of the common infrastructure.

In some embodiments, a fabric manager 703 may govern partitioning by a hypervisor and manage partition execution environments.

Below the dashed-line, in FIG. 7, is a fabric 701, including the physical fabric 704, the logical fabric 705, and the fabric manager 703. Various components expose services S1 . . . Sn that may be invoked by various services and/or applications.

The logical fabric 705 may comprise the hypervisor module that manages the partitions 706, the partition interconnections 707, e.g., storage and communications, and the partition images and blueprints 708. They physical fabric 704 comprising the platforms 716 and the physical interconnect 717.

The fabric manager 703 is responsible for the management of the components below the dashed line, within the fabric 701. This is achieved by consuming services S1 . . . Sn that are exposed at the physical 704 and partitioning layers 705.

Above the dashed-line is one or more of the customer's executing software 709 environments. Depending upon the embodiment, various management tools 709, 710, 711, 712 may be deployed with blueprints 708. Four non-limiting examples are shown in the exemplary of FIG. 7. In some embodiments, management tools may manage at the fabric level and not above, e.g., power control tools.

One example of a management tool is an Enterprise Management Framework 709, which consumes information through agents and APIs that are exposed by hardware of the platform, and operating system 713, middleware 714, and/or applications 715 of a partition image. This information may be used to monitor the platform, operating system, middleware and applications, providing service management information capabilities, such as capacity management, asset management, incident management and others.

Another example of a management tool utilized by embodiments of the fabric manager may be a lifecycle manager 710. A lifecycle manager may automate the lifecycle of images 708 within partitions 706, by consuming the fabric manager's services S1-S5. That is, in some embodiments, the fabric manager 703 may commission and/or decommission an image 708 of a partition 706. The lifecycle manager 710 may interact with the fabric manager's services S1-S5 to facilitate automation of commissioning and decommissioning.

Depending upon the embodiment, the fabric manager may provide for a number of functions. In some embodiments, a fabric manager may automate provisioning of new secure partitions, and in some cases, further allow a customer to control the process. In some embodiments, a fabric manager may switch between a plurality of operating system and/or application environments, resize them, and/or retarget them to a different partition. In some embodiments, a fabric manager may monitor and/or manage components of the fabric through a single user interface, or "single pane of glass." In some embodiments, a fabric manager may perform centralized auditing of various user actions; in such embodiments, the fabric manager may perform logging. In still further embodiments, a fabric manager may further perform call home services.

Depending upon the embodiments, the single pane of glass interface controlling fabric manager, and may facilitate platform management, partition management, component diagnostics, infrastructure automation, auditing and/or logging, providing alerts for events and remediation, identity and access management, license management, and provisioning and configuration of partitions. The user interface may further provide controls of partitions, for example, the interface may allow administrators and/or customers to add a platform, commission partitions, decommission partitions, resize a commissioned partition, and perform call home services. The interface may facilitate adding operating system images and blueprints.

In embodiments where the fabric manager may automate commissioning, an administrator may instantiate a partition lifecycle limit on the partition. The partition may be created out using a blueprint and gold image, or it could be created out of a customer-supplied image or blueprint.

Moreover, some embodiments in which the fabric manager facilitates commissioning, an initial discovery may be performed by the fabric manager to make sure that the target platform receiving the partition has adequate resources available for commissioning the partition image.

Such a determination may check whether the target platform has adequate network connections, disks, access valid blueprints, access to valid operating system images, sufficient computing resources such as sufficient cores and memory to use.

Depending upon the embodiment, an administrator may select a valid blueprint, or the fabric manager may automatically select the valid blueprint. For example, if the administrator or operator wants to commission the SLES 11 SP3 partition image it could select the blueprint as SLES 11 SP3.

Some embodiments of the interface implement a unified management GUI having role-based controls allowing a plurality of individuals to administer the various aspects of the common infrastructure system. Role-based controls may facilitate multiple people in different roles for administering different pieces of the common infrastructure system.

Some embodiments of a common infrastructure can authenticate users using existing credentials. Credentials may be managed by any commonly used credential management service, such as lightweight directory access protocol ("LDAP"), a native user directory, or Kerberos.

In some embodiments, the fabric manager may set up a security partition that facilitates user authentication. In some cases, one or more services have access to the various internal LANs, but not a broader enterprise LAN in which an authentication directory may reside. A security partition facilitates an authentication source for a common infrastructure service to authenticate itself, thus effectively reaching the enterprise credentials by proxy.

In such embodiments, the fabric manager may authenticate using the selected credential management service. The security partition represents a single point of authentication for the fabric manager to authenticate a user or service so that anyone on any infrastructure server can use the security partition for authentication.

In some embodiments, this fabric management platform is the source of time for the platform components, such as the hypervisor of each platform. However, the fabric management platform itself can be the source of time, or alternatively it can be connected to another time source. For some partition images, a customer of the common infrastructure may select the fabric management platform as the time server, or some other source. Service partitions may all use the fabric management platform as the time server.

Some embodiments of the fabric manager may monitor a health status of any of the fabric manager, the common infrastructure, a particular partition, and/or a particular platform. In such embodiments the fabric manager may monitor a server health for resource usage such CPU usage, memory usage, swap usage, and disk usage.

Some embodiments of the fabric manager monitor may display platform status information on a user interface. This status information related to the platform may relate to a call home event, in which an infrastructure threatening event requires the fabric manager to send a notification of the event to an administrator or vendor. Such status information may also include information concerning power status, partition status, and/or hypervisor status.

Some embodiments of a fabric manager may disable a partition. Disabling is required to facilitate resizing a partition. Resizing is an optional fabric manager feature allowing the fabric manager to instruct hypervisor to enable, disable, or amend allocated resources of, a partition when more than one partition resides on a platform. In other words, disabling a partition may release one or more platform resources so that those resources may be used by another partition.

In embodiments of the fabric manager that may decommission a partition, the fabric manager may delete or completely destroy a partition from the platform to free the platform resources for one or more new commissioned partitions.

In embodiments of the fabric manager that may add a new platform, the fabric manager must incorporate a new physical platform added to the infrastructure. That is adding a platform may be the initial installation of a platform. In some cases, a non-partitionable enterprise partition platform (NEPP) is added, which is platform without a hypervisor.

A fabric manager may be connected to the platforms and partitions through a dedicated fabric manager LAN network.

Embodiments of the fabric manager that manage blueprints and/or images may add a blueprint, handle uploaded blueprints, delete blueprints, and/or authorize new gold images.

In some circumstances, a customer may need a new blueprint and/or a new image to be added, and in some the existing images could be deleted before adding the new image. Embodiments of the fabric manager may allow a customer to upload one or more new images. This customer may select uploading the new image to multiple platforms. There are similar embodiments of the fabric manager to facilitate managing the blueprints in the common infrastructure.

Some embodiments of the fabric manager may monitor infrastructure events. Events may be general events or call home events. General events may be audit or system-related events generated by the system regarding the general health of the infrastructure, the components, and applications. Audit events are associated with user actions, such as when a user logs in or out, performs some operation like powering on a device, or instantiates commissioning of one or more partition images.

Call home events may be a set of events generated from the platform and events relating to the platform. For example, hardware failures of the CPU processor and/or failure of the hypervisor. In some embodiments, the fabric manager may pull events from the platforms and/or hypervisors at regular intervals. In further embodiments, the fabric manager may perform some filtering and then send some of these critical call home events to the manufacture and/or vendor.

In some embodiments, call home events may be published to an one or more common infrastructure management tools or systems, which are outside of the fabric. For example, an event may be published to an external agent or application to inform a third-party servicer, and/or other concerned parties or software, of changes to the common infrastructure, such as a resource being added or deleted.

Data Storage

Some embodiments of a common infrastructure include data storage and data analytics capabilities. Such embodiments comprise one or more distributed file systems, e.g., Hadoop, for expandable data storage and/or analytics efforts. An exemplary fabric may commission as many partitions containing distributed file systems as needed, thereby supporting the analytics efforts performed by applications. In some embodiments, commissioning and decommissioning such data storage partitions may be handled by a fabric manager.

Data Storage in a Data Foundation

In a common infrastructure paradigm data may be stored on one or more physical platforms, e.g. physical servers, capable of storing data. In some cases, these platforms may be formed grouped into one or more clusters. In some embodiments of data storage, data retrieval may occur from, or by, one or more commodity components.

Storage and execution of data in a common infrastructure may be in manner that is agnostic to the infrastructure's commodity components, e.g., applications, data, databases, and/or analytics logic. That is, the data may utilized by each of the individual operating systems and/or databases such that data may reside within the common infrastructure wherever the most effective mix of reliability, security, and convenience may be found.

A common infrastructure embodiment may store data in a data foundation comprising one or more physical platforms for storing and/or retrieving data and implementing various data analytics techniques. The data foundation may facilitate data analytics and/or transactional applications that requires the use of one or more databases and analytical engines, such as an application for online reservations or booking. Such applications may utilize heterogeneous sub-components residing on the common infrastructure.

The data foundation may facilitate analytics tools that drive data processing of the stored data. These analytics tools are drawn from the infrastructure's heterogeneous components, and may draw data stored within the infrastructure's heterogeneous components. The data is drawn from these various components using tailored metadata perspectives that mitigate well-known complications for accessing data across these heterogeneous systems.

In some embodiments, these metadata perspectives are stored in a metadata perspective store, which may be a non-transitory machine-readable storage medium. Metadata perspectives control execution of a metadata processor. The metadata perspectives processor may implement a metadata perspective associated with a particular database model, to structure according to the particular database model.

Data stored in the common infrastructure may be available for ubiquitous or near-ubiquitous accessibility, both geographically and technologically.

In some embodiments, the common infrastructure may store data in a database requiring the data to conform to a well-known structural representational model. Examples might include relational databases, object-oriented databases, and network databases. In such embodiments, the common infrastructure migrates data into a common data store storage paradigm, discussed below.

A first data foundation functionality relocates traditional client-server databases, such as Oracle® and Microsoft SQL Server®, onto one or more multi-partition platforms. The partitions will be co-resident with a trusted common infrastructure environment, thereby facilitating quick application database to external database without application changes by leveraging features of the common infrastructure, such as the interconnect fabric.

Another data foundation functionality is implementing a distributed file system. The distributed file system is incorporated into one or more common infrastructure platforms to facilitate deployment of new applications and/or extend existing applications.

In some embodiments, this may data foundation functionality may include one or more native application programming interfaces (API). In other embodiments, the functionality may be drawn from a diverse selection of open data analytics tools and distributed file system software. Implementing this data foundation functionality combines data residing on the common infrastructure with other data sources, into customizable, dynamic, business-relevant decision support solutions.

Another data foundation functionality facilitates ubiquitous data access by replicating data to one or more platforms within the common infrastructure. Some embodiments implement a databus that extracts new and updated data from the common infrastructure and other data sources. The databus transforms the data using metadata techniques to meet representational demands of one or more common infrastructure components, and may then automatically apply one or more updates to the common infrastructure and/or other data sources. Some embodiments may implement a databus to agnostically make data available to the various applications residing in the common infrastructure, performing analysis, monitoring, and action.

Common Data Store and Metadata Perspectives

A common infrastructure embodiment may implement a common data store that may store data in a format free of the representational constraints imposed upon the system by well-known databases. Data stored in this common data store may be used by a component in the infrastructure, without requiring replication from one database to another.

A common data store may store data into a form that is free of representational constraints, such as those required by relational databases. In this form, the system may implement data wherever the data is required without necessitating replication. Embodiments utilizing a common data store may use metadata and software generation techniques to create tailored "metadata goggles" allowing components to automatically view data in the expected former representational forms.

Figure 8A:
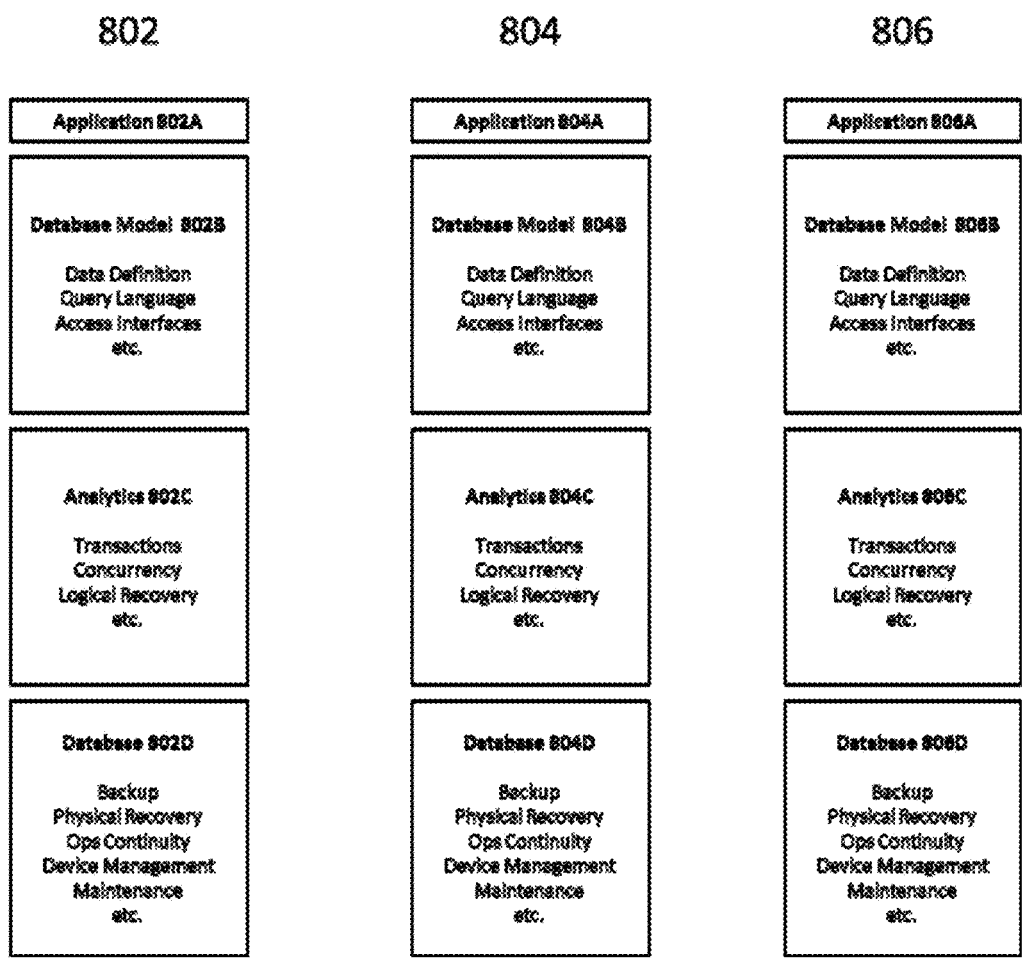
FIG. 8A illustrates a prior art data storage paradigm where data conforms to expected structural requirements of a database.

FIG. 8A illustrates a prior art data storage paradigm where data conforms to expected structural requirements of a database.

In FIG. 8A, three applications 802a, 804a, 806a store and retrieve data in a prior art data storage paradigm. An application 802a stores data in a particular database 802d. The application and the database communicate through an expected data model 802b, which maintains an expected set of structural rules for the data being stored and retrieved. Thus, data analytics 802c may not be performed on data used by another application 804a since it must be stored in another database 804d in a manner conforming to that database 804d. Often, data must be replicated between databases 802d, 804d to permit backups and/or to ensure operability of the replicated data.

Figure 8B:
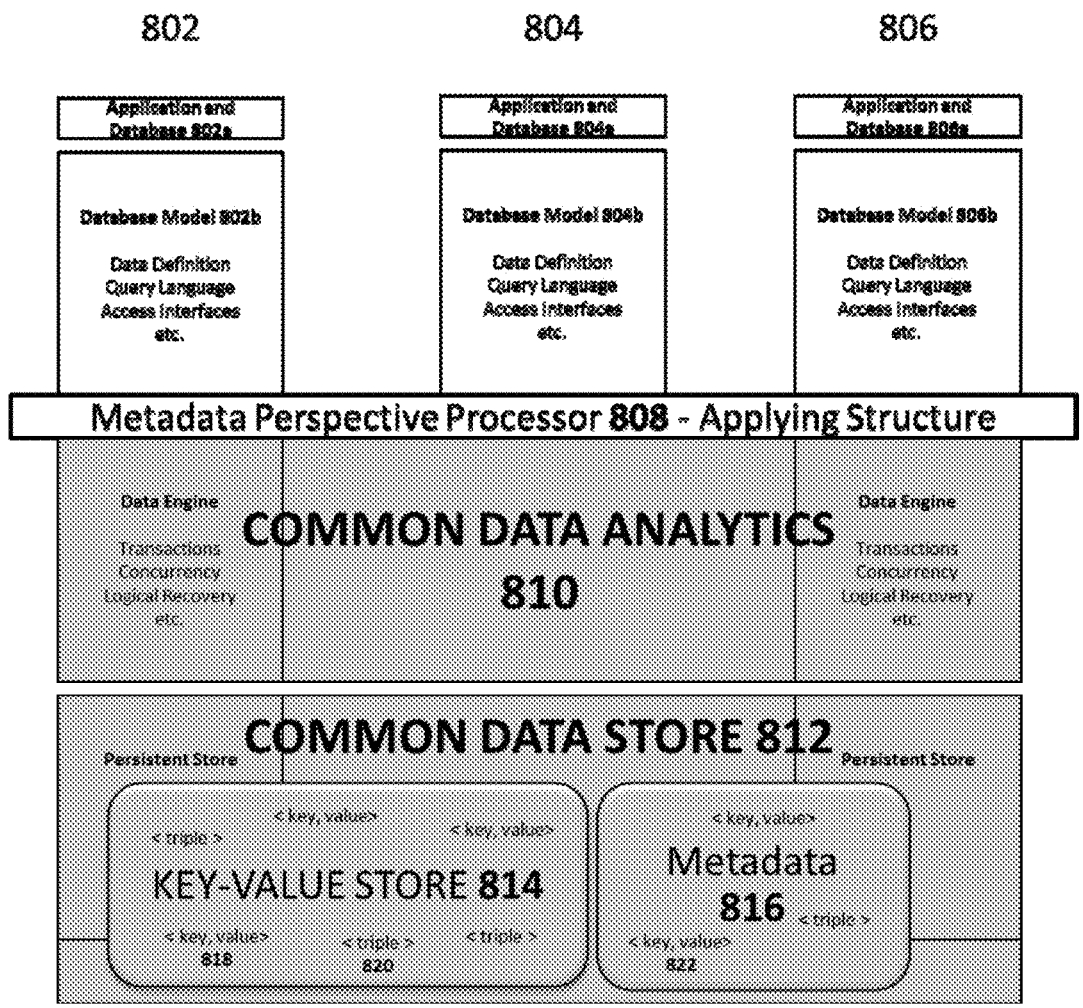
FIG. 8B, illustrates one embodiment of a data foundation common data store.

FIG. 8B, illustrates one embodiment of a data foundation common data store.

In the exemplary embodiment, the data foundation 800 common data store may comprise a key-value store 812, which stores one or more key-value pairs 818 in a non-transitory machine-readable storage medium. A key-value pair 818 comprises a key that is a unique identifier for uniquely identifying an associated datum, or value. A value may be information of any type, and is not limited to numerical values. In some circumstances, a key-value pair 818 may be a triple 820. A triple 820 being data composed of, or stored in, a subject-predicate-object format.

The data foundation 800 uses a key-value store 812 as a means of deconstructing data to remove the models 802b, 804b, 806b imposed by a database 802d, 804d, 806d, or other data source, originally receiving or transmitting the data. The key-value store 812 stores data in a manner that is agonistic to the various databases 802d, 804d, 806d, and/or data sources. The data foundation 800 may comprise a metadata perspective processor 808. When data is accessed from the data foundation 800 by an application 802a, the metadata perspective processor 808 may reconstruct the data, which is now stored as key-value pairs 818, into objects that satisfy the database model 802b expected.

Using metadata tags 822 stored in a meta store 816, the common data store 812 may generate one or more metadata perspectives 808 that are each tailored to the various database models 802b, 804b, 806b that are storing and querying data into the data foundation 800.

The commodity applications 802a, 804a, 806a interact with one or more databases in the infrastructure. The applications 802a, 804a. 806a may store and/or retrieve data from these various databases. Each of these databases may implement a different representational structure, or model 802b, 804b, 806b defining the manner in which data is organized when the data is stored and/or retrieved by an application 802b, 804b, 806b through a particular database.

For example, in the event that a commodity application 802a is storing new data in a database, the commodity application 802a, or other middleware, must present that new data to the database in a model 802b expected by the database. Such representational conformity within a single database may hinder usability of the data across database models 804b, 806b.

A metadata perspective 808 generated by the data foundation 800 allows the data to be presented to a database in a model 802b the database expects, though the underlying data is unchanged. The metadata perspectives 808 allow commodity applications, programs, and devices, to automatically view data in the representational form they expect.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for managing computing resources comprising:
   monitoring, by a managing computer executing a fabric manager software module, one or more execution environments associated with one or more partitions of a plurality of computers, wherein each respective computer comprises a partition hosting an execution environment, and wherein an the execution environment comprises an operating system and one or more services executed by an the operating system;
   detecting, by the managing computer, a service need associated with a first execution environment of a first partition of a first computer when the operating system of the first execution environment does not comprise the service needed;
   providing, by the managing computer, a service of a second execution environment of the first partition of a second computer to the first execution environment of the first partition of the first computer based on the service need associated with the first execution environment;
   executing, by the managing computer, each of the one or more services independently of each of the execution environments; and
   executing, by the managing computer, each of the one or more services independently of each of the one or more services
   commissioning, by the computer, onto one or more partitions one or more new images executing one or more services associated with an application;
   automatically identifying, by the computer, one or more redundant partitions to store one or more sets of at least one of the services, wherein each redundant partition is a partition capable of storing a set of at least one of the services;
   commissioning, by the computer, each set of services onto redundant partition, wherein the redundant partition is a partition capable of executing the set of services;
   detecting, by the computer, one or more failed services corresponding to the one or more one or more services commissioned onto a partition;
   automatically triggering, by the computer, a set of one or more redundant partitions to respectively execute the set of services corresponding to the one or more failed services.

2. The method according to claim 1, further comprising:
   commissioning, by the computer, on a first platform a new partition having a new operating system image executing a set of new services, wherein the new partition is associated with a new execution environment.

3. The method according to claim 2, further comprising:
   automatically determining, by the computer, one or more redundant platforms to store at least a portion of the new partition, wherein a redundant platform is a platform capable of executing the at least a portion of the new partition; and
   commissioning, by the computer, the at least a portion of the new partition onto each of the redundant platforms.

4. The method according to claim 3, further comprising:
   automatically triggering, by the computer, a redundant platform to execute the at least a portion of the new partition on the redundant platform when the first platform fails to execute a portion of the new partition corresponding to the at least a portion of the new partition on the redundant platform.

5. The method according to claim 1, wherein
   each of the operating systems in the one or more execution environments respectively execute the one or more services independently.

6. The method according to claim 1, further comprising:
   detecting, by the computer, a service need from a scaled-back execution environment,
   wherein the operating system of the scaled-back execution environment executes only a subset of services of the services available to the operating system, and
   wherein the subset of services are application services required to execute an application.

7. The method according to claim 1, wherein the computer provides the service from the second execution environment to the first execution environment over an interconnect service of the operating system of a service partition.

8. The method according to claim 1, further comprising:
providing, by the computer, a service to support one or more applications executed in an execution environment.

9. The method according to claim 1, further comprising:
executing, by the computer, the one or more services independently from a common infrastructure manager processor.

10. The method according to claim 1, wherein the operating system of the first execution environment is a first operating system that is different from the operating system of the second execution environment that is a second operating system.

11. A distributed-computing system comprising:
a managing computer executing a fabric manager module configured to manage one or more execution environments hosted on a plurality of computers, and to manage one or more fabric operating system services executed by at least one operating system of at least one execution environment;
each respective computer of the plurality of computers comprising one or more partitions,
wherein a partition is configured to host an execution environment comprising an operating system comprising one or more partition services, and
wherein the one or more fabric operating system services comprise a set of the one or more partition services of the at least one operating system in the execution environment of the partition from at least two computers, the one or more partition services:
commission onto one or more partitions one or more new images executing one or more services associated with an application;
automatically identify one or more redundant partitions to store one or more sets of at least one of the services, wherein each redundant partition is a partition capable of storing a set of at least one of the services;
commission each set of services onto a redundant partition, wherein the redundant partition is a partition capable of executing the set of services;
detect one or more failed services corresponding to the one or more one or more services commissioned onto a partition; and
automatically trigger a set of one or more redundant partitions to respectively execute the set of services corresponding to the one or more failed services;
an interconnect linking a plurality of execution environments, wherein the fabric manager of the managing computer is configured to provide a partition service of the operating system of a first execution environment of a first computer to a second execution environment of a first partition of a second computer to satisfy a partition service need upon the fabric manager of the managing computer detecting the partition service need, and wherein the partition service is in the set of fabric operating system services.

12. The system according to claim 11, wherein the operating system of the first execution environment is a first operating system that is different than a second operating system in the second execution environment.

13. The system according to claim 11, wherein a platform further comprises a hypervisor partitioning one or more platform resources to create one or more partitions on the platform.

14. The system according to claim 11, further comprising:
a fabric manager processor managing one or more hypervisors and configured to commission anew partition hosting a new operating system having one or more new partition services.

15. The system according to claim 11, further comprising
an interconnect comprising one or more physical communication cables linking a first platform to a second platform.

16. The system according to claim 11, wherein the one or more execution environments execute one or more applications independently from the fabric operating system services.

17. The system according to claim 11, wherein the operating system of a partition is a scaled-back operating system that executes a subset of partition services associated with an application, and wherein a subset of unused partition services of the scaled-back operating system are allocated as fabric operating system services.

18. The system according to claim 11,
wherein each of the fabric operating system services execute independently of each of the execution environments, and
wherein each of the fabric operating system services execute independently of each of the fabric operating system services.

19. The system according to claim 11, wherein each of the execution environments and each of the partition services execute independently on a partition.

20. The system according to claim 11, wherein the fabric operating system uses a native application programming interface of a partition service when a provider execution environment provides the partition service to a consumer execution environment.

* * * * *